United States Patent
Yang

(10) Patent No.: US 8,627,401 B2
(45) Date of Patent: Jan. 7, 2014

(54) SMART TV-BAND WHITE SPACE IDENTIFIER

(75) Inventor: Liuqing Yang, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 50 days.

(21) Appl. No.: 13/254,295

(22) PCT Filed: Apr. 2, 2010

(86) PCT No.: PCT/US2010/029833
§ 371 (c)(1),
(2), (4) Date: Sep. 1, 2011

(87) PCT Pub. No.: WO2010/115140
PCT Pub. Date: Oct. 7, 2010

(65) Prior Publication Data
US 2012/0017256 A1    Jan. 19, 2012

Related U.S. Application Data

(60) Provisional application No. 61/166,417, filed on Apr. 3, 2009.

(51) Int. Cl.
*H04N 7/16* (2011.01)

(52) U.S. Cl.
USPC .............................. 725/151; 725/93; 725/148

(58) Field of Classification Search
USPC ............................................ 725/93, 148, 151
See application file for complete search history.

(56) References Cited

U.S. PATENT DOCUMENTS

| | | | |
|---|---|---|---|
| 7,680,600 B2 * | 3/2010 | Carnegie et al. | 702/17 |
| 7,804,887 B2 * | 9/2010 | Page | 375/219 |
| 7,852,868 B2 * | 12/2010 | Gardner et al. | 370/438 |
| 8,341,678 B1 * | 12/2012 | Du Val | 725/74 |
| 2005/0160471 A1 * | 7/2005 | Cohen | 725/116 |
| 2006/0067354 A1 | 3/2006 | Waltho et al. | |
| 2007/0220576 A1 | 9/2007 | Rouhana | |
| 2008/0207136 A1 | 8/2008 | Haiyun et al. | |
| 2009/0235316 A1 * | 9/2009 | Wu et al. | 725/81 |
| 2010/0124254 A1 * | 5/2010 | Wu et al. | 375/131 |
| 2010/0172634 A1 * | 7/2010 | Devictor et al. | 386/123 |
| 2010/0195580 A1 * | 8/2010 | Samarasooriya et al. | 370/329 |

\* cited by examiner

*Primary Examiner* — Pankaj Kumar
*Assistant Examiner* — Sahar Baig
(74) *Attorney, Agent, or Firm* — Saliwanchik, Lloyd & Eisenschenk

(57) ABSTRACT

Embodiments of a white space identifier are provided. According to one embodiment, the active channel information of a cable TV can be obtained through receiving and decoding a channel changing operation command from a remote control. The active channel information can then be transmitted to white space devices located within an interference range using a wireless transmitter. The wireless transmitter can be set to utilize a narrow fixed bandwidth.

24 Claims, 2 Drawing Sheets

SMART TV-BAND WHITE SPACE IDENTIFIER

CROSS-REFERENCE TO RELATED APPLICATIONS

This application is the U.S. national stage application of International Application Serial No. PCT/US10/29833, filed Apr. 2, 2010, which claims the benefit of U.S. Provisional Application Ser. No. 61/166,417, filed Apr. 3, 2009, which are hereby incorporated by reference in their entirety, including any figures, tables, or drawings.

BACKGROUND

With the transition from analog to digital TV broadcasting comes the availability of bandwidth for new generations of wireless devices. After the transition, many channels become available, especially the upper ranges of the TV bands such as channels 14-83, also known as ultrahigh frequency or UHF. These available channels are vacant frequencies. The FCC is considering freeing up this so-called "white space" spectrum to unlicensed devices (a.k.a. white space devices or WSD) in order to promote a more effective use of the public airwaves. The envisioned WSDs include but are not limited to high-speed wireless network connections and cable-less home entertainment systems. These WSDs present new opportunities for consumers to efficiently use currently unused spectrum. With the growing use of Wi-Fi and other unlicensed devices in everything from laptops to next-generation PDAs and cell phones, WSDs provide much-needed additional capacity for broadband connectivity and home and community networking.

WSDs are expected to operate in a cognitive manner by sensing and detecting over-the-air digital TV (DTV) signals and avoiding these occupied frequency bands. However, cable TV (CATV) also shares part of this "white space" spectrum. Hence WSDs avoiding over-the-air DTV band may still cause interference to television receivers connected to CATV service. Such interference was confirmed in tests and reported by the FCC in "Direct-pickup interference tests of three consumer digital cable television receivers available in 2005," by S. R. Martin (OET Report FCC/OET 07-TR-1005, Jul. 31, 2007) and "Evaluation of the performance of prototype TV-band white space devices phase II," by S. K. Jones et al. (OET Report FCC/OET 08-TR-1005, Oct. 15, 2008).

The Oct. 15, 2008 report discussed the capability of prototype TV-band WSDs to detect over-the-air DTV signals. The tested prototype devices described in this report were provided by Adaptrum, the Institute for Infocomm Research (I2R), Microsoft Corporation (Microsoft), Motorola Inc., and Philips Electronics North America Corp (Philips). According to this report, the detection threshold sensitivity of the devices varied from −106 dBm to −128 dBm for the over-the-air DTV signals. The sensing times are 0.1 second/channel for the Motorola device, 37-185 seconds/channel for the Adaptrum device, and 8-50 seconds/channel for the Philips device. The other device sensing times are not specified in the FCC report.

Among these tested prototype devices, none has reported the ability to identify CATV usage information. The current white space identification is performed based on spectrum sensing, which is not effective for CATV.

However, the interference from these devices to CATV have been tested and proved to be non-negligible. In addition, both reports indicate that the interference effect is significant even for low power devices.

From the reported signal detection performance for over-the-air DTV signals, it can be inferred that it is essentially impossible for the prototype devices to sense and avoid CATV active channel since the signal leakage from the CATV (if any) is significantly weaker than over-the-air DTV signals, while the number of CATV channels is large.

As a result, obtaining knowledge on the active channel usage of CATV is critical for the identification of usable TV-band white space which complies with the FCC's regulation of "zero interference tolerance."

Accordingly, there is a need in the art for a white space identifier directed for use with active cable TV channels.

BRIEF SUMMARY OF THE INVENTION

Embodiments of the present invention relate to identification of usable TV-band white space spectrum for white space device applications.

According to an embodiment of the present invention, a white space identifier is provided that can decode a received channel-changing-command of an infrared-emitting remote control of a TV set to determine the active channel number of a user's cable TV. The decoded active channel number can then be broadcast via a wireless transmitter to all white space devices (WSDs) in the interference range. The infrared receiver parameters of the subject identifier can be set according to the model and make of the TV set at an initialization step.

In one embodiment, the wireless transmitter of implementations of the subject identifier only needs to send the number of the active cable TV channel. In total, there are 166 channels for the CATV broadcasting in North America, each having a specific and unique channel number and specific and unique frequency band. In such embodiments, the WSDs can then determine the frequency band of the active channel using a look-up table. Since the wireless transmitter only requires very low data rate when transmitting information regarding the number of the active cable TV channel, a very narrow fixed bandwidth can be assigned via the controller for the wireless transmitter for this purpose.

The subject identifier can be implemented using a stand-alone device having an infrared sensor and wireless controller. In another embodiment, the subject identifier can be incorporated as a component of a TV set, or a smaller stand-alone device (such as a set-top box, VCR/DVR, etc.) connected to the TV set via wired or wireless means. In yet another embodiment, the wireless transmitter can be integrated in the TV remote control or a global remote control. In such an embodiment, the channel changing operation of the remote control can directly trigger the wireless transmitter. In a further embodiment, multiple TV sets can be accommodated.

DETAILED DISCLOSURE OF THE INVENTION

Embodiments of the present invention provide white space identification for white space device applications. A smart white space identifier is provided that can locally address cable TV (CATV) usage information.

Unlike over-the-air DTV broadcast signals, the active CATV channel is a user-specified parameter that is readily available on a local basis. Presently, the active channel of a TV set is almost exclusively set via a remote control which emits infrared signals. To ensure convenient remote controlling operation, the infrared beam usually has a broad beamwidth. Because a relatively broad beamwidth is emitted from a remote control, devices within the vicinity of the TV can also sense the infrared beam. Therefore, in an application of the present invention, the subject white space identifier can be located near enough to the TV set to receive the infrared beam. The information in the infrared beam containing the channel changing command can be decoded by the subject white space identifier. The decoded signal can provide the active channel number of the TV. This can be accomplished, in part, because the center frequency and bandwidth of the active CATV are well defined. For example, in total, there are 166 channels for the CATV broadcasting in North America, each having a specific and unique channel number and specific and unique frequency band. Once obtained, the active channel number can then be broadcast via a wireless transmitter to all WSDs in the interference range. In such embodiments, the WSDs can then determine the frequency band of the active channel using a look-up table.

Figure 1:
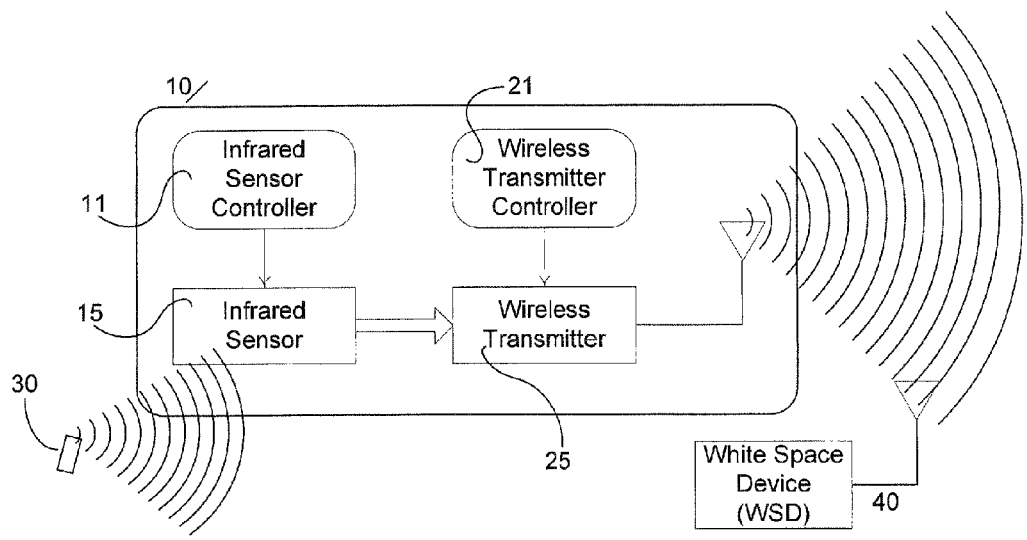
FIG. 1 shows a schematic diagram of a white space identifier in accordance with a first embodiment of the present invention.

Accordingly, referring to FIG. 1, in one embodiment, a stand-alone white space identifier 10 can include an infrared controller 11, an infrared sensor 15, a wireless transmitter controller 21, and a wireless transmitter 25. The infrared controller 11 and the wireless transmitter controller 21 can be separate components, integrated with their respective devices, or integrated in a single processor connected to the infrared sensor 15 and the wireless transmitter 25. By being located within the range of an infrared signal from a remote control 30 for the TV (or related TV equipment), the infrared sensor 15 can sense the infrared signal.

The white space identifier 10 can be initialized by setting the infrared sensor/receiver parameters according to the model and make of the TV. In an embodiment, the infrared sensor controller 11 can be used to adapt and/or configure the white space identifier to a particular model and make of the TV. A processor (not shown) and memory components (not shown) can be used to perform the decoding of the signal received by the infrared sensor.

According to an embodiment, when the channel changing signal is transmitted from the remote control 30 of the TV (or related TV equipment), the infrared sensor 15 will sense the infrared signal. By pre-setting with the information of TV model and maker in the infrared sensor controller 11, the infrared sensor can decode the received infrared signal and determine the active CATV channel in use.

After determining the active CATV channel, the processor can send the number of the active CATV channel to wireless transmitter 25 that is controlled by the wireless controller 21. The wireless transmitter can be used to transmit the number of the active CATV channel. Any kind of modulation schemes can be adopted, for example, BPSK, QPSK, QAM, etc.

When transmitting only the number of the active CATV channel, a very low data rate can be used. For example, the channel number can be sufficiently encoded by 8 bits ($2^8$=256>166). In addition, the active channel information does not change very often, so one does not need to continuously transmit the number of the active CATV channel. Suppose the total time for transmitting is 1 second, then the required data rate (i.e. bandwidth) will be only 8 bit per second. Even taking into account of some extra overhead bits (such as error control coding etc.), the data rate will be within tens of bits per second. This low data rate transmission only requires tens of Hertz bandwidth even with low bandwidth efficiency modulation schemes.

Thus, a very narrow fixed bandwidth can be assigned via the wireless transmitter controller 21. The WSDs 40 can easily determine the bandwidth of the active channel using a look-up table.

In an alternative embodiment, the white space identifier can include look-up tables and determine the corresponding bandwidth of the active channel. Then this information can be transmitted wirelessly to the WSDs 40.

Figure 2:
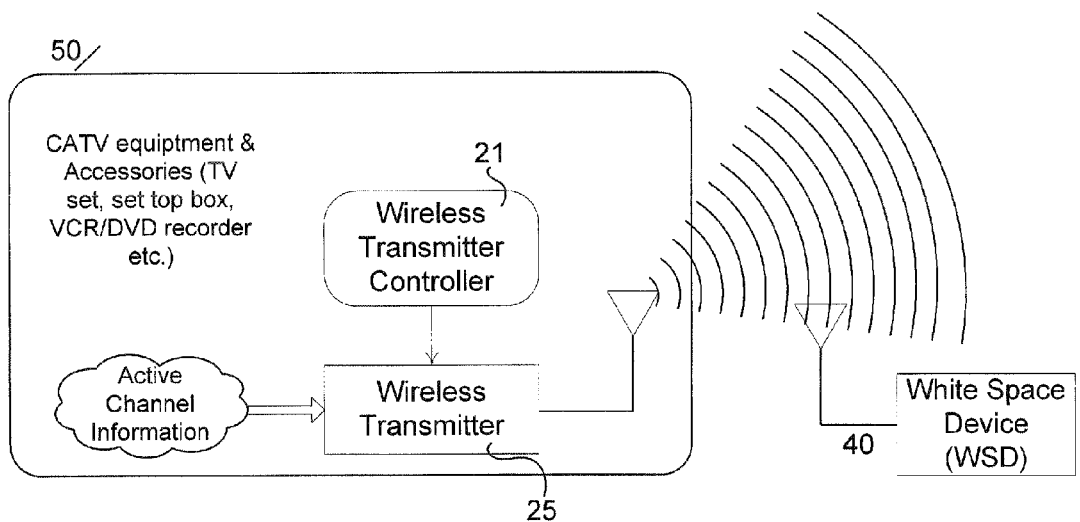
FIG. 2 shows a schematic diagram of a white space identifier in accordance with a second embodiment of the present invention.

Referring to FIG. 2, a white space identifier 50 according to another implementation can be integrated with the TV set, TV equipment, or TV accessories, which include, but are not limited to, a set top box, VCR, DVD player, and digital video recorder. In such an embodiment, the infrared sensor 15 and controller 11 of the embodiments described with respect to FIG. 1 can be replaced by the TV set (equipment or accessories). Thus, the wireless controller and transmitter (21,25) can either be an integrated component of the TV set or a smaller standalone device connected to the TV set via wired or wireless means. That is, the active channel information can be received directly from the TV (or indirectly if received through a set top box or recorder) and then transmitted to WSDs 40 through a wireless transmitter 25.

Figure 3:
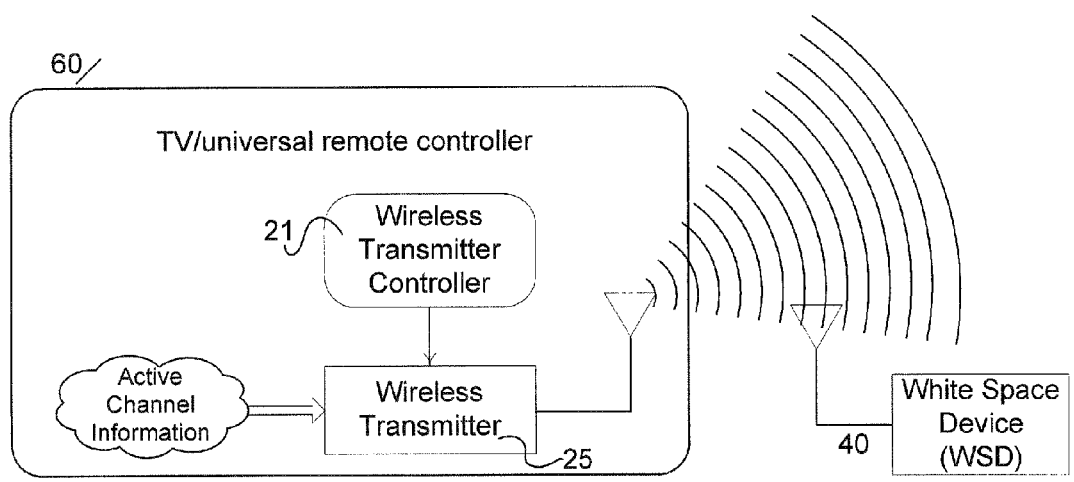
FIG. 3 shows a schematic diagram of a white space identifier in accordance with a third embodiment of the present invention.

In yet another implementation, as shown in FIG. 3, the white space identifier 60 can be integrated with the TV remote control or a global remote control. That is, a wireless transmitter (21,25) can be integrated into a remote control such that the channel changing operation of the remote directly triggers the wireless transmitter 25 to send the channel changing information to the WSDs 40.

For example, the electronic circuit in the remote control that detects a channel changing operation by a user and controls an infrared light emitting device based the user input can also provide a channel identifier signal to the wireless transmitter. The channel identification can be accomplished as part of the operations of the electronic circuit or by a separate processing module connected to the electronic circuit that receives the signal sent to the infrared light emitting device and determines the active channel.

In a further embodiment, multiple TV sets can be accommodated. To accommodate multiple TV sets, for the stand-alone option as shown in FIG. 1, each TV set has a white space identifier. By accommodating each TV set with a white space identifier, interference from a neighboring television (such as located in another room of a dwelling or in a neighbor's condo or apartment) that is within the range of a WSD can be avoided. The active channel information of the multiple TV sets can be transmitted separately for each TV set. Where multiple TV sets are positioned closely together, such that a signal from a remote control directed to one TV set can also be read by another of the TV sets, the infrared sensor 15 of a white space identifier is made to accommodate all kinds of infrared signals by multiple TV models and makers. The active channel information of multiple TV sets can be transmitted together whenever one of them changes. According to certain embodiments, a memory storing the information of active channels can be included for the white space identifier 10.

In one embodiment using a white space identifier for each TV, whenever transmitting the active channel information, the white space identifier 10 can further include an identifier for the TV using the channel. The WSDs 40 can take care of the multiple active channel information transmitted by the white space identifier 10. Alternatively, the wireless transmission coverage for each identifier can be set according to the interference range of the WSDs. For example, if a WSD is out of the range of an identifier, then it will not interfere into the TV associated with this identifier. In such embodiments, the WSDs can avoid a need for noting the TV locations because no TV ID information is utilized.

For the TV-integrated option shown in FIG. 2, when transmitting the active channel information, the white space identifier 50 integrated in each TV can include a unique identifier for its own TV set. In other embodiments, the unique identifier can be omitted. The WSDs 40 can simply remove the multiple active channel frequency bands from the usable list. A similar procedure can be adopted for the implementation of remote controller-integrated white space identifier 60 shown in FIG. 3.

According to certain embodiments, when implemented as a stand-alone device, the subject white space identifier can be powered by plugging into a power outlet. In addition, when integrated with a TV or remote control, the subject white space identifier can be implemented to draw very little power from the TV or remote control by being configured to require infrequent wireless transmission at extremely low data rate.

In a further embodiment, a database of cable channels available in a geographic region and/or regional cable television packages can be included in the white space identifier. In certain embodiments, initialization of the white space identifier can include programming the white space identifier to acknowledge the particular cable package purchased by a user and provide information regarding always-available channels based on known available channels not purchased by the user.

A purpose of TV-band white space identification is to avoid WSD interference to designated, licensed channels. In this case, a purpose is to avoid both over-the-air DTV and active CATV channels. Existing white space identifiers are currently based on spectrum sensing. Their capability of detecting DTV signals have been confirmed in recent FCC tests and reports. However, existing technology in WSDs cannot determine the active CATV channel and thus cannot avoid interference to the active CATV channel. Accordingly, embodiments of the present invention can be utilized in applications where WSDs may interfere with CATV.

It is to be understood that the figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

All patents, patent applications and publications referred to or cited herein are incorporated by reference in their entirety, including all figures and tables, to the extent they are not inconsistent with the explicit teachings of this specification.

Examples of embodiments of the invention are provided below. These examples should not be construed as limiting.

1. A TV-band white space identifier comprising:
an infrared sensor capable of sensing a channel changing command signal from a remote control for a TV set;
a processing module connected to the infrared sensor and configured to decode the channel changing command signal sensed by the infrared sensor to determine an active channel number of the TV set; and
a wireless transmitter configured to transmit the active channel number of the TV set to a white space device.

2. The TV-band white space identifier of embodiment 1, wherein the TV-band white space identifier is provided as a stand-alone apparatus.

3. The TV-band white space identifier of embodiment 1, wherein the TV-band white space identifier is provided as a component of another device or apparatus.

4. A TV-band white space identifier comprising:
a processing module configured to receive active channel information for a cable TV; and
a wireless transmitter configured to transmit the active channel information to a white space device.

5. The TV-band white space identifier of embodiment 4, wherein the TV-band white space identifier is disposed within a TV-set or set top box.

6. The TV-band white space identifier of embodiment 4, wherein the active channel information is the active channel number.

7. The TV-band white space identifier of embodiment 6, wherein the wireless transmitter transmits the active channel number over a narrow fixed bandwidth using a very low data rate.

8. The TV-band white space identifier of embodiment 4, wherein the active channel information is a bandwidth of the active channel.

9. A remote controller, comprising:
a processing module configured to determine an active channel number of a TV set; and
a wireless transmitter configured to receive the active channel number from the processing module and transmit the active channel number to a white space device.

10. A TV-band white space identifier capable of determining the active channel information of one or more cable TVs and transmitting the active channel information to white space devices within an interference range of the one or more cable TVs.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. A white space identifier comprising:
a sensor for sensing a channel changing command signal from a remote control for a TV set;
a processing module connected to the sensor and configured to decode the channel changing command signal sensed by the sensor to determine an active channel number of the TV set, the active channel number being a current channel number from which the TV set is actively receiving content for broadcast; and a wireless transmitter configured to transmit active channel information to a white space device in order for the white space device to avoid using the current channel number.

2. The white space identifier according to claim 1, wherein the sensor is an infrared sensor.

3. The white space identifier according to claim 1, wherein the active channel information transmitted to the white space device is the active channel number of the TV set determined by the processing module.

4. The white space identifier according to claim 1, further comprising a memory storing a look-up table providing information on a corresponding frequency band for each active channel number, wherein the active channel information transmitted to the white space device is the corresponding frequency band for the active channel number of the TV set determined by the processing module.

5. The white space identifier according to claim 1, comprising a stand-alone package housing the sensor, the processor, and the wireless transmitter.

6. A cable television apparatus comprising:
a white space identifier module, comprising:
a processing module configured to receive active channel information for the cable television apparatus, the active channel information being a current channel from which the cable television apparatus is actively receiving content for broadcast; and a wireless transmitter configured to transmit the active channel information from the processing module to a white space device in order for the white space device to avoid using the current channel.

7. The cable television apparatus according to claim 6, wherein the cable television apparatus is a TV-set or set top box.

8. The cable television apparatus according to claim 6, wherein the cable television apparatus is a digital video recorder, DVD player, or video player.

9. The cable television apparatus according to claim 6, wherein the active channel information is an active channel number.

10. The cable television apparatus according to claim 9, wherein the wireless transmitter is configured to transmit the active channel number over a fixed bandwidth using a data rate of less than 10 bits per second.

11. The cable television apparatus according to claim 6, wherein the active channel information is a bandwidth of the active channel.

12. A remote controller, comprising:
a processing module configured to determine an active channel number of a TV set from a user input of the remote controller, the active channel number being a current channel number from which the TV set is actively receiving content for broadcast; and a wireless transmitter configured to receive the active channel number from the processing module and transmit the active channel number to a white space device in order for the white space device to avoid using the current channel number.

13. The remote controller according to claim 12, comprising:
an electronic circuit that detects a channel changing operation by a user and outputs a control signal; and
an infrared light emitting device receiving the control signal from the electronic circuit and emitting an infrared signal in a frequency corresponding to the active channel,
wherein the processing module receives the control signal from the electronic circuit to determine the active channel number.

14. The remote controller according to claim 12, comprising:
an electronic circuit that detects a channel changing operation by a user and outputs a control signal; and
an infrared light emitting device receiving the control signal from the electronic circuit and emitting an infrared signal in a frequency corresponding to the active channel,
wherein the electronic circuit comprises the processing module, wherein the wireless transmitter receives the active channel number from the electronic circuit.

15. A method of identifying white space for one or more white space devices, the method comprising:
receiving active channel information of a cable TV based on a channel changing command from a user, the active channel information being a current channel from which the cable TV is actively receiving content for broadcast; and transmitting the active channel information to the one or more white space devices using a wireless transmitter of a white space identifier in order for the one or more white space devices to avoid using the current channel.

16. The method according to claim 15, wherein the receiving of the active channel information of the cable TV comprises:
sensing a channel changing command signal from a remote control using a sensor of the white space identifier; and
decoding the sensed channel changing command signal sensed by the sensor to determine an active channel number.

17. The method according to claim 16, wherein the transmitting of the active channel information to the one or more white space devices comprises:
transmitting the active channel number to the white space identifier.

18. The method according to claim 16, further comprising determining a frequency band corresponding to the active channel number using a look-up table stored in a memory of the white space identifier,
wherein the transmitting of the active channel information to the one or more white space devices comprises:
transmitting the frequency band corresponding to the active channel number to the white space identifier.

19. The method according to claim 15, wherein the receiving of the active channel information of the cable TV comprises:
receiving the active channel information from a cable television apparatus receiving the channel changing command,
wherein the wireless transmitter is disposed in the cable television apparatus receiving the channel changing command.

20. The method according to claim 19, wherein the cable television apparatus is at least one of a television, a set top box, a VCR, a DVD player, and a DVR.

21. The method according to claim 19, wherein the transmitting of the active channel information to the one or more white space devices comprises: transmitting an identifier of the cable television apparatus using the channel with the transmitting of the active channel information.

22. The method according to claim 15, wherein the white space identifier is in a remote control, wherein the receiving of the active channel information of the cable TV comprises:
detecting the channel changing command from the user using an electronic circuit of the remote control; and
determining the active channel information using the detected channel changing command.

23. The method according to claim 15, further comprising:
initializing the white space identifier to decode infrared signals of a remote control based on a selected make and model of a cable television apparatus.

24. The method according to claim 15, further comprising:
initializing the white space identifier to acknowledge unused channels or frequency bands of a cable product package based on a selected cable product package; and transmitting information representing the unused channels or frequency bands of the cable product package to the one or more white space devices.

* * * * *